United States Patent [19]

Inukai et al.

[11] Patent Number: 5,441,459
[45] Date of Patent: Aug. 15, 1995

[54] HYDRAULIC CONTROL APPARTUS FOR AUTOMATIC TRANSMISSION

[75] Inventors: Seiichi Inukai, Kyoto; Kenjiro Fujita, Kusatsu; Akihiro Kondo, Kyoto; Katsutoshi Usuki, Kyoto, all of Japan

[73] Assignee: Mitsubishi Jidosha Kogyo Kaubshiki Kaisha, Tokyo, Japan

[21] Appl. No.: 174,259

[22] Filed: Dec. 28, 1993

[30] Foreign Application Priority Data

Dec. 28, 1992 [JP] Japan .................................. 4-347662

[51] Int. Cl.$^6$ ........................................ B60K 41/04
[52] U.S. Cl. ........................................ 475/127; 475/123
[58] Field of Search ............... 475/116, 120, 123, 127, 475/128

[56] References Cited

U.S. PATENT DOCUMENTS

| | | | |
|---|---|---|---|
| 2,782,657 | 2/1957 | Lucia | 475/127 X |
| 3,014,383 | 12/1961 | Flinn | 475/120 X |
| 3,710,649 | 1/1973 | Kubo | 475/127 |
| 5,291,804 | 3/1994 | Kashihara et al. | 475/127 |

*Primary Examiner*—Charles A. Marmor
*Assistant Examiner*—Nathan O. Jensen

[57] ABSTRACT

A hydraulic control device for an automatic transmission including a first frictional engaging element for achieving a low-speed side position, a second frictional engaging element for achieving a position higher in speed than the low-speed side position, a third frictional engaging element for achieving a position even higher in speed than the high-speed side position, a regulator valve for regulating pressure from an oil pump to a predetermined pressure and reducing the predetermined pressure in response to supply of a pilot pressure, and a control valve for controlling the pressure from the regulator valve to a desired hydraulic pressure, for controlling hydraulic pressures to the plural frictional engaging elements. A change-over valve is provided for making the control valve in communication with one of the first frictional engaging element and the third frictional engaging element and supplying and discharging the pilot pressure to the regulator valve, so that the change-over valve is operated by hydraulic pressure supplied to the second frictional engaging element and takes a first position where the control valve communicates with the first frictional engaging element and blocks supply of the pilot pressure to the regulator valve when the supply pressure is lower than a predetermined value, and takes a second position where the control valve communicates with the third frictional engaging element and supplies the pilot pressure to the regulator valve when the supply pressure to the second frictional engaging element is higher than a predetermined value.

3 Claims, 6 Drawing Sheets

Fig.2

| | 1st speed | 2nd speed | 3rd speed | 4th speed | 5th speed | Reverse | Neutral |
|---|---|---|---|---|---|---|---|
| 1st speed · reverse brake 36 | O | | | | | O | O |
| 2·5 speed brake 31 | | O | | | O | | |
| 1-4 speed clutch 20 | O | O | O | O | | | |
| 3-5 speed clutch 34 | | | O | O | O | | |
| 1-3 speed · reverse brake 53 | O | O | O | | | O | O |
| 4·5 speed clutch 52 | | | | O | O | | |
| Reverse clutch 33 | | | | | | O | |
| One-way clutch 54 | X | X | X | | | | |

Fig. 5

|  | 1st speed | 2nd speed | 3rd speed | 4th speed | 5th speed | Reverse | Neutral |
|---|---|---|---|---|---|---|---|
| First electromagnetic change-over valve 111 | ON | OFF | OFF | ON | ON | ON | ON |
| Second electromagnetic change-over valve 112 | OFF | ON | OFF | OFF | ON | OFF | OFF |
| Third electromagnetic change-over valve 113 | ON | ON | ON | ON | OFF | OFF | OFF |
| Fourth electromagnetic change-over valve 114 | OFF | OFF | ON | ON | ON | OFF | OFF |
| Fifth electromagnetic change-over valve 115 | ON | ON | ON | OFF | OFF | ON | ON |

HYDRAULIC CONTROL APPARTUS FOR AUTOMATIC TRANSMISSION

FIELD OF THE INVENTION

This invention relates to a hydraulic control apparatus for an automatic transmission which is possible to simplify the mechanical components.

BACKGROUND OF THE INVENTION AND RELATED ART

In an automatic transmission using planetary gear mechanisms, a plurality of frictional engaging elements for binding plural sets of planetary gear units and a plurality of rotational elements constituting these planetary gear units are incorporated in a transmission input shaft connected to a crank shaft of an engine through a torque converter, and combinations of engaging conditions of these frictional engaging elements are changed over by way of a hydraulic pressure to achieve a desired shift position.

For this case, an automatic transmission is proposed in Japanese Patent Publication Laid-open (Japanese OPI) 63-210443, 63-210445, and others in which a plurality of electromagnetic change-over valves individually duty controlled are incorporated in the individual frictional engaging elements and electronically controlled to independently control hydraulic pressures supplied to the plurality of frictional engaging elements.

In such an automatic transmission, an increased number of electromagnetic change-over valves, which are considerably more expensive than a spool valve, must be used in association with an increase in the number of shift positions, leading to an increase in parts cost.

Then, a type is proposed in Japanese OPI 62-41466 and others, in which a hydraulic pressure change-over valve is disposed between an electromagnetic valve and two frictional engaging elements, and hydraulic oil is supplied by the hydraulic pressure change-over valve to one of the two frictional engaging elements, thereby reducing the number of electromagnetic change-over valves.

The hydraulic control apparatus for an automatic transmission disclosed in Japanese OPI 62-41466 and others is provided with a shuttle valve for changing over a single electromagnetic valve to forward frictional engaging elements and a direct-connecting clutch, and the shuttle valve is to change over a signal pressure to a control valve for controlling hydraulic pressure supplied to the individual frictional engaging elements.

In consideration of abrasion resistance of facing and the like of frictional engaging elements of an automatic transmission and a decrease in shift-time, it is preferable to vary hydraulic pressure supplied to these frictional engaging elements according to the magnitude of driving torque of the engine. That is, it is preferable to set the hydraulic pressure supplied to the frictional engaging elements to a large value in a low-speed stage where the driving torque of the engine is relatively large to prevent slipping in a frictional engaging element in the engaged condition, and to decrease the hydraulic pressure of hydraulic oil (hereinafter referred to as "line pressure") supplied from an oil pump into a hydraulic pressure circuit to decrease a loss in the oil pump in a high-speed stage where the driving torque of the engine is relatively small.

For this purpose, a hydraulic control apparatus for an automatic transmission proposed in Japanese OPI 63-210445, for example, is provided with a hydraulic pressure change-over valve which, when a high-speed side position is selected, supplies a pilot pressure to a regulator valve for reducing hydraulic oil from the oil pump to a predetermined line pressure to reduce the line pressure and, when a high-speed side position is selected, supplies a pilot pressure from the hydraulic pressure change-over valve to the regulator valve to reduce the line pressure supplied from the regulator valve to individual frictional engaging elements.

However, in the automatic transmission disclosed in Japanese OPI 63-210445, an increased number of electromagnetic change-over valves, which are considerably more expensive than a spool valve, must be used in association with an increase in the number of shift positions, coupled with requirement for the hydraulic pressure change-over valve, leading to an increase in cost.

In this regard, the apparatus disclosed in Japanese OPI 62-41466 is possible to reduce the number of electromagnetic change-over valves, but does not disclose a technology to change over the line pressure between the low-speed and high-speed side shift positions.

OBJECT AND SUMMARY OF THE INVENTION

Therefore, a primary object of the present invention is to provide a hydraulic control apparatus for an automatic transmission which is possible to simplify the mechanical components.

In accordance with the present invention, there is provided a hydraulic control apparatus for an automatic transmission comprising a first frictional engaging element for achieving a low-speed side position, a second frictional engaging element for achieving a position higher in speed than the low-speed side position, a third frictional engaging element for achieving a position even higher in speed than the high-speed side position, a regulator valve for regulating hydraulic pressure of hydraulic oil discharged from an oil pump to a predetermined pressure and reducing the predetermined hydraulic pressure in response to supply of a pilot pressure, a control valve for controlling the hydraulic pressure from the regulator valve to a desired hydraulic pressure, for controlling hydraulic pressures to the plurality of frictional engaging elements, and a multifunction change-over valve for making the control valve in communication with one of the first frictional engaging element and the third frictional engaging element and supplying and discharging the pilot pressure to the regulator valve, wherein the change-over valve is operated by hydraulic pressure supplied to the second frictional engaging element and takes a first position where the control valve communicates with the first frictional engaging element and blocks supply of the pilot pressure to the regulator valve when the supply hydraulic pressure is lower than a predetermined value, and takes a second position where the control valve communicates with the third Frictional engaging element and supplies the pilot pressure to the regulator valve when the supply hydraulic pressure to the second frictional engaging element is higher than a predetermined value.

In this case, it is effective that the pilot pressure corresponds to the pressure of hydraulic oil supplied to the second frictional engaging element.

When a low-speed side position is selected, since hydraulic oil is not supplied to the second frictional engaging element, the change-over valve takes a first position to block supply of the pilot pressure to the regulator valve, and hydraulic oil supplied from the regulator valve is supplied to the first frictional engaging element to achieve the low-speed side position.

When a position higher in speed than the low-speed side position is selected, hydraulic oil supplied from the regulator valve to the second frictional engaging element to achieve a position higher in speed than the low-speed side position.

At this moment, when hydraulic pressure supplied to the second frictional engaging element increases exceeding a predetermined value, the multifunction change-over valve takes a second position to supply the pilot pressure to the regulator valve, thereby reducing the line pressure from the regulator valve.

When a speed position even higher in speed than the high-speed position is selected, hydraulic oil pressure-controlled by the pilot pressure from the regulator valve is controlled by the control valve to a predetermined pressure, and supplied to the third frictional engaging element through the multifunction change-over valve, thereby achieving a speed position even higher in speed than the high-speed position.

With the hydraulic control apparatus for an automatic transmission according to the present invention, since the multifunction change-over valve functions as a hydraulic pressure change-over valve for supplying the pilot pressure to the regulator valve and also as a hydraulic pressure change-over valve for supplying hydraulic oil from the control valve to one of the first frictional engaging element and the third frictional engaging element, so that the changing over to the two frictional engaging elements is achieved by a single control valve, the number of the hydraulic pressure change-over valves and control valves can be reduced to simplify the hydraulic control apparatus, thereby reducing the parts cost and production cost.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 2 is an operation element chart showing the relation between engagement condition of individual frictional engaging elements and speed positions.

FIG. 5 is an operation element chart showing the relation between energizing of the electromagnetic change-over valves and speed positions.

DETAILED DESCRIPTION OF PREFERRED EMBODIMENTS

Figure 1:
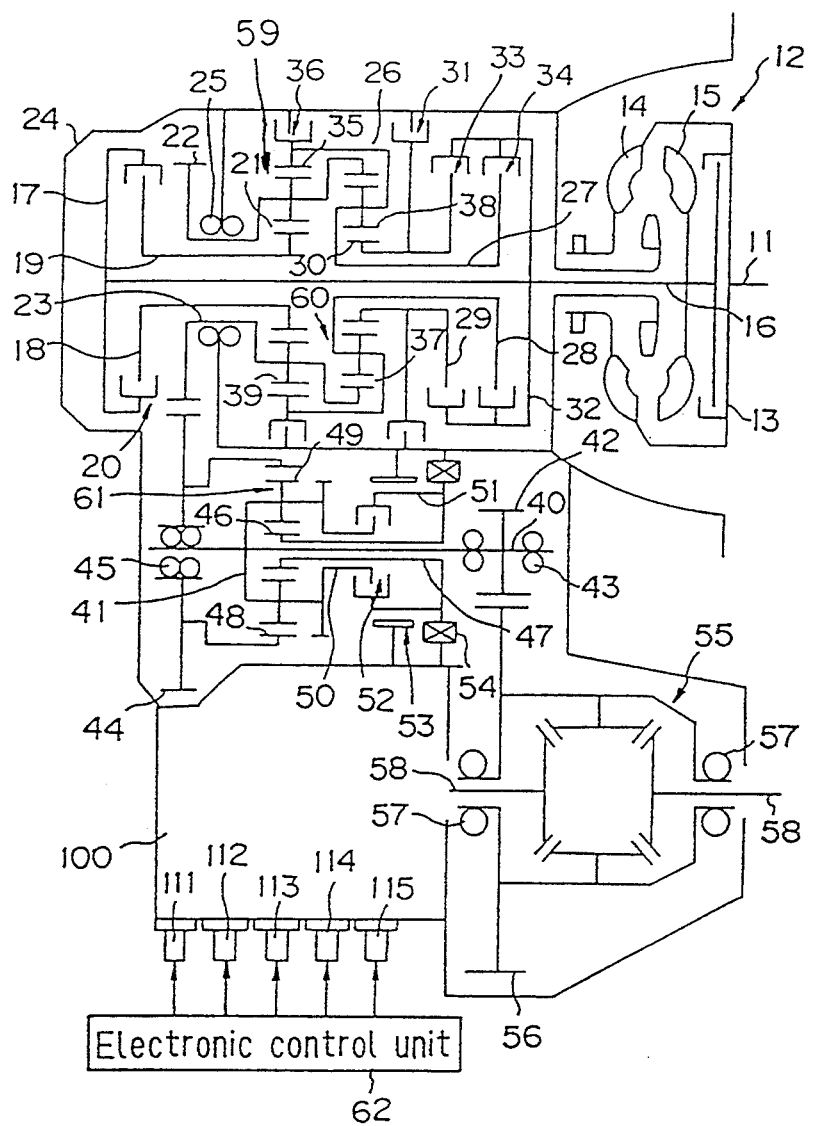
FIG. 1 is a skeletal view showing a drive system of an embodiment in which the hydraulic control apparatus for an automatic transmission according to the present invention is applied to an automatic transmission of five forward speeds and a reverse speed.

As shown in FIG. 1, which is a schematic view showing a power-transmission mechanism of an embodiment of an automatic transmission having five forward speeds and a reverse speed equipped on a front wheel drive type vehicle to which the present invention is applied, a drive shaft 11 connected to a crank shaft of an engine (not shown) is connected with a pump 14 formed integrally with an input case 13 of a torque converter 12. A turbine 15 of the torque converter 12 opposing the pump 1–4 is provided integrally with a 1–4 speed clutch retainer 17 through a transmission input shaft 16. A first sleeve 19 formed at one end with a 1–4 speed clutch hub 18 opposing the 1–4 speed clutch retainer 17 is rotatably engaged with the transmission input shaft 16, and a 1–4 speed clutch 20 for changing over-the engaging condition is disposed between the 1–4 speed clutch retainer 17 and the 1–4 speed clutch hub 18.

At the other end of the first sleeve 19, a first sun gear 21 is integrally formed, and the first sleeve 19 between the first sun gear 21 and the 1–4 speed clutch hub 18 is engaged rotatably with a first carrier 23 formed at one end with a transmission gear 22. A bearing 25 for rotatably holding the first carrier 23 is disposed between the first carrier 23 and a transmission case 24.

In addition, a second sleeve 27 formed at one end integrally with a second carrier 26 is rotatably engaged with the transmission input shaft 16 between the torque converter 12 and the first sleeve 19, and a 3–5 speed clutch hub 28 is integrally formed at the other end of the second sleeve 27. Further, a second sun gear 30 formed integrally with a clutch brake hub 29 is rotatably engaged with the second sleeve 27 between the second carrier 26 and the 3–5 speed clutch hub 28.

A 2-5 speed brake 31 for changing over the rotation binding condition of the clutch brake hub 29 is disposed between one end (left side in FIG. 1) of the clutch brake hub 29 and the transmission case 24. A twin clutch retainer 32 surrounding the other end (right side in FIG. 1) and the 3–5 speed clutch hub 28 is formed integrally with the transmission input shaft 16, and a reverse clutch 33 and a 3–5 speed clutch 34 for changing over individually the engaging condition of these components are disposed between the twin clutch retainer 22 and the clutch brake hub 29 and the 3–5 speed clutch hub 28.

The second carrier 26 is formed integrally with a first internal gear 95 opposing the first sun gear, and a 1st speed reverse brake 96 for changing over the rotation binding condition of the second carrier 26 together with the first internal gear 25 is disposed between the outer peripheral side of the first internal gear 39 and the transmission case 24.

The second carrier 26 is also provided rotatably with a second internal gear 37 integrally formed at the other end of the first carrier 23 and a second planetary gear 38 engaging with the second sun gear 30. Similarly, the first carrier 23 is provided rotatably with the first internal gear 35 and a first planetary gear 39 engaging with the first sun gear 21.

A cylindrical third carrier 41 is integrally provided at the center of a transmission output shaft (second transmission shaft) 40 disposed parallel to the transmission input shaft 16 and rotatably supported at one end on the transmission case 24 through a bearing (not shown), and the other end of the transmission output shaft 40 formed with a front wheel output gear 42 is rotatably supported directly by a bearing 45 to the transmission case The third carrier 41 is engaged with a driven gear engaging with the transmission gear 22 to be relatively rotatable through the bearing 45, and a third sleeve formed at one end with a third sun gear 46 is rotatably engaged with the transmission output shaft 40 between the third carrier 41 and the front wheel output gear 42. A third internal gear 48 opposing the third sun gear 46 is formed integrally to the driven gear 44, and a third planetary gear 49 engaging with the third sun gear 46 and the third internal gear 48 is rotatably mounted to the third carrier 41.

A 4·5 speed clutch hub 50 is integrally formed at the other end of the third carrier 41, and a 4·5 speed clutch retainer 51 surrounding the 4·5 speed clutch hub 50 is fixed to the other end of the third sleeve 47. A 4·5 speed clutch 52 for changing over the engaging condition of these components is disposed between the 4·5 speed clutch hub 50 and the 4·5 speed clutch retainer 51, and a 1-3 speed·reverse brake 53 for changing over the rotation binding condition of the third sleeve 47 along with the 4·5 speed clutch retainer 51 is disposed between the outer peripheral side of the 4·5 speed clutch retainer and the transmission case 24.

A one-way clutch 54 for regulating the rotational direction of the third sleeve 47 is disposed between the other end of the third sleeve 47 and the transmission case 24, whereby operations of the individual clutches 20, 33, and 52, and the individual brakes 31, 36, and 53 are combined as shown in FIG. 2 to achieve the five forward speeds and one reverse speed. In FIG. 2, the symbol "○" indicates the engaging condition of the corresponding frictional engaging element, and the symbol "x" indicates that the one-way clutch 54 binds rotation of the third sleeve 47 when a driving force from the engine is transmitted to the transmission output shaft 40 side.

The front wheel output gear 42 of the transmission output shaft 40 is engaged with an input gear 56 of a front differential 55, and the front differential 55 with both ends rotatably supported on the transmission case 24 through the bearing 57 is provided with a pair of driving shafts 58 connected individually to right and left front wheels (not shown) through universal joints (not shown).

The clutches 20, 33, 34, and 52, and brakes 31, 36, and 93 which function as frictional engaging elements to rotation elements constituting three planetary gear units 59, 60, and 61 individually incorporating the first to third planetary gears 38, 39, and 49 have piston or servo units (not shown), and hydraulic oil is supplied to or discharged from these components to engage or disengage the clutches 20, 33, 34, and 52, and the brakes 31, 36, and 53.

For example, when the 1–4 speed clutch 20, the 1st speed·reverse brake 36, and the 1-3 speed·reverse brake 53 are engaged, rotation of second carrier 26 of the second planetary gear unit 60 and the third sleeve 47 of the third planetary gear unit 61 is bound, driving force from the drive shaft 11 is transmitted from the transmission gear 22 to the driven gear 44 through the torque converter 12, the transmission input shaft 16, the 1–4 speed clutch 20, the first sun gear 21 of the first planetary gear unit 52, the first planetary gear 39, and the first carrier 23, further through the third internal gear 48 of the third planetary gear unit 61, the third planetary gear 49, and from the third carrier 41 to the transmission output shaft 40 to achieve the 1st shift position, and transmitted to the right and left drive shafts 58 through the front wheel output gear 42, the input gear 56, and the front differential 55.

Then, with the 1–4 speed clutch 20 and the 1-3 speed·reverse brake 53 engaged, when the 1st speed·reverse brake 36 is released to engage the 2·5 speed brake 31, rotation of the second sun gear 30 of the second planetary gear unit 60 and the third sleeve 47 of the third planetary gear unit 61 is bound, driving force from the drive shaft 11 is transmitted from the transmission gear 22 to the driven gear 44 through the first sun gear 21 of the first planetary gear unit 59, the first planetary gear 39, the first internal gear 35, the second carrier 26 of the second planetary gear unit 60, the second planetary gear 38, the second internal gear 37, and the first carrier 23, further from the third internal gear 48 of the third planetary gear unit 61, the third planetary gear 49, the third carrier 41, to the transmission output shaft 40 to achieve the 2nd speed position.

Further, with the 1–4 speed clutch 20 and the 1-3 speed·reverse brake 53 engaged, when the 2.5 speed brake 31 is released and the over drive clutch 34 is engaged, the second carrier 26 of the second planetary gear unit 60 and the third sleeve 47 of the third planetary gear unit 61 are bound, driving force from the drive shaft 11 is transmitted from the 1-4 speed clutch 20 side to the first sun gear 21 of the first planetary gear unit 59, and further from the 3-5 speed clutch 34 side to the first internal gear 35 integral with the second carrier 26 of the second planetary gear unit 60. That is, since the first sun gear 21 and the first internal gear 35 rotate integrally, rotation of the transmission input shaft 16 is transmitted, as is, through the first planetary gear 39 and the first carrier 23, from the transmission gear 22 to the driven gear 44, further from the third internal gear 48 of the third planetary gear unit 61, the third planetary gear 49, the third carrier 41, to the transmission output shaft 40 to achieve the 3rd speed position.

Further, with the 1-4 speed clutch 20 and the 3-9 speed clutch 34 engaged, when the 1-3 speed·reverse brake 53 is released and the 4·5 speed clutch 52 is engaged, rotation of the second carrier 26 of the second planetary gear unit 60 is bound and the third sleeve 47 of the third planetary gear unit 61 and the third carrier 41 are integrated, the second sun gear 30 of the second planetary gear unit 60 and the second carrier 26 rotate integrally, and rotation of the drive gear 44 is transmitted, as is, to the transmission output shaft 40. As a result, in the present embodiment, the 4th speed position is achieved where the transmission input shaft 16 and the transmission output shaft 40 rotate at the same rotational speed.

With the over drive clutch 34 and the 4·5 speed clutch 52 engaged, when the 1-4 speed clutch is released and the 2·5 speed brake 31 is engaged, the second sun gear 30 of the second planetary gear unit 60 is fixed, driving force from the drive shaft 11 is transmitted through the over drive clutch 34, from the second carrier 26 integral with the second sleeve 27, to the second planetary gear 38, the second internal gear 37, and the first carrier 23 to achieve the 5th speed position where rotation of the transmission gear 22 is faster than that of the transmission input shaft 16.

On the other hand, when only the reverse clutch 33, the 1st speed-reverse brake 96, and the 1-3 speed-·reverse brake 53 are engaged, the second carrier 26 of the second planetary gear unit 60 and the third sleeve 47 of the third planetary gear unit 61 are fixed, driving force from the drive shaft 11 is transmitted from the reverse clutch 33 to the second sun gear 30 of the second planetary gear unit 60, the second planetary gear 38, and the second internal gear 37 in the reverse rotational direction, further through first carrier 23 integral with the second internal gear 37, from the transmission gear 22 to the driven gear 44, from the third internal gear 48 of the third planetary gear unit 61, the third planetary gear 49, the third carrier 41, to the transmission output shaft 40 to achieve the reverse speed position.

With the 1st speed-reverse brake 36 and the 1-3 speed-reverse brake 53 engaged, when the reverse clutch 33 is released, driving force from the drive shaft 11 is transmitted only to the transmission input shaft 16 to enter the neutral position where the transmission input shaft 16 idles.

Figure 3:
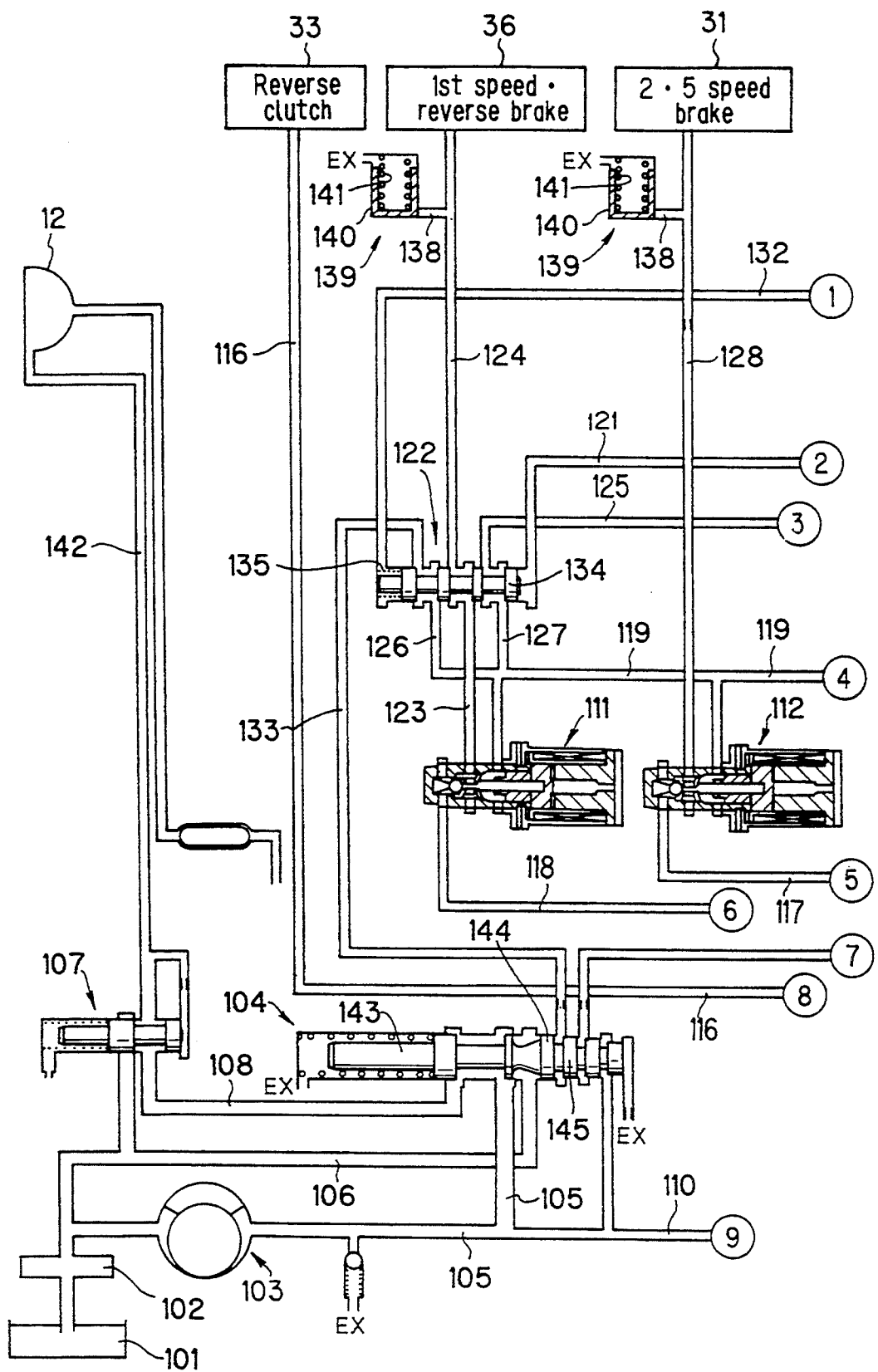
FIG. 3 is a schematic view showing structure of a main part of a hydraulic circuit in the hydraulic pressure control circuit in the present embodiment along with FIG. 4.
Figure 4:
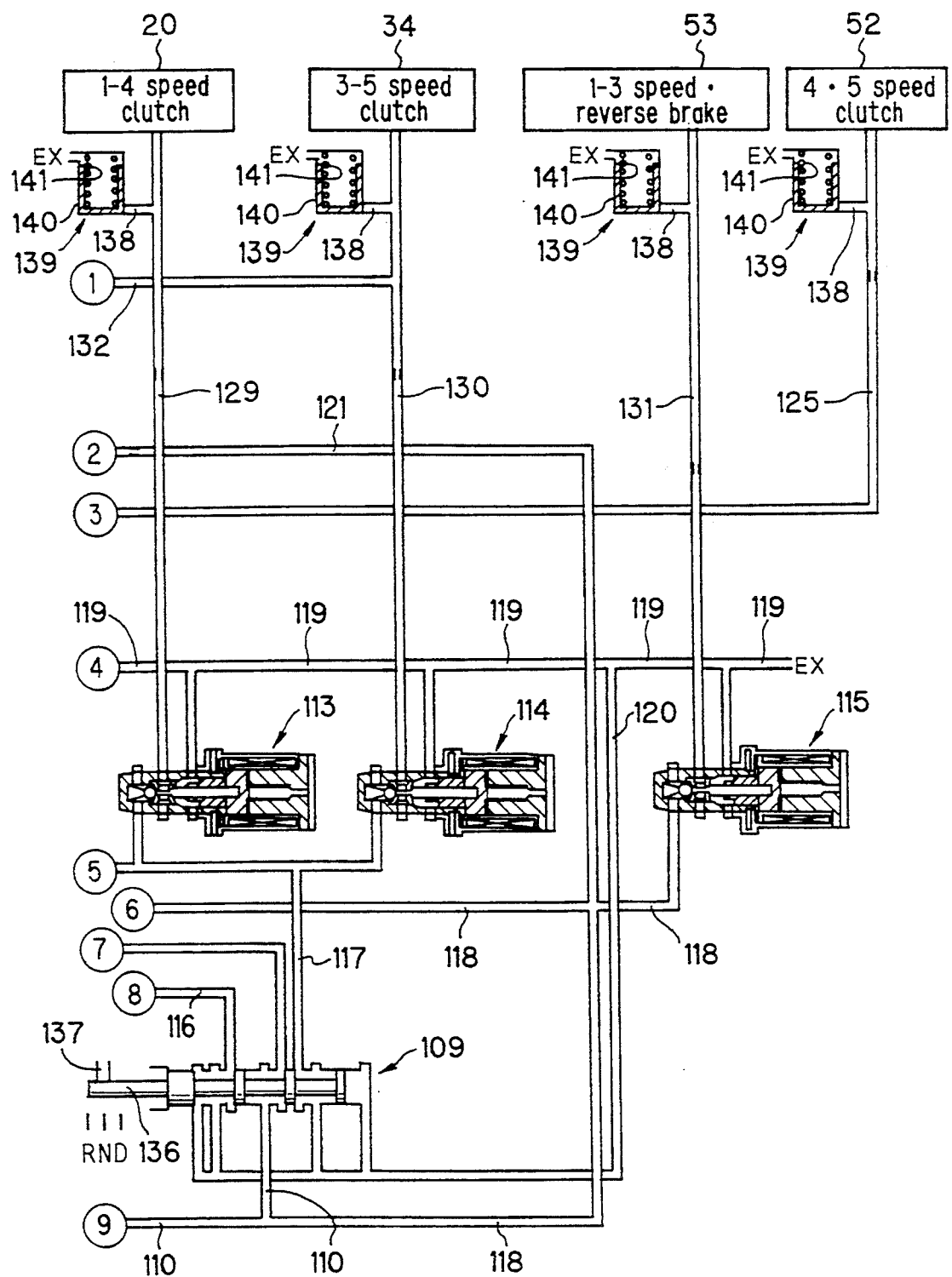
FIG. 4 is a schematic view showing structure of a main part of a hydraulic circuit in the hydraulic pressure control circuit in the present embodiment along with FIG. 3.

To achieve the individual speed positions shown in FIG. Z, a hydraulic control apparatus 100 for controlling supply and discharge of hydraulic oil to the above-described clutches 20, 33, 34, and 52, and the brakes 31, 36, and 33 is disposed at the lower part of the transmission case 24. As shown in FIGS. 3 and 4 showing the structure of the main portion of the hydraulic control apparatus 100 in the present embodiment, the apparatus 100 supplies hydraulic oil suctioned by an oil pump 103 from an oil reservoir 101 through an oil filter 102 to the torque converter 12, and selectively supplies or discharge the hydraulic oil from the clutches 20, 33, 34, and 52, and the brakes 31, 36, and 53 or the servo mechanism according to the operation condition of the vehicle to engage or disengage these frictional engaging elements, and the structure and functions thereof are as already known.

That is, the oil pump 103 is connected with a regulator valve 104 for adjusting the hydraulic pressure to a preset desired value (hereinafter referred to as "line pressure") through an oil passage 105, and excess hydraulic oil from the regulator valve 104 is returned to the suction side of the oil pump 103 through a return oil passage 106. The regulator valve 104 is connected with a torque converter control valve 107 for controlling supply hydraulic pressure to the torque converter 12 through an oil passage 108. Further, a manual valve 109 operating following a P range for parking, an R range for reverse traveling, an N range for stopping, and a D range which enables automatic shift change between the 1st speed position and the 5th speed position set on the shift lever (not shown) to be operated by the driver is connected halfway in the oil passage 105 through an oil passage 110.

In the present embodiment, in addition to the abovedescribed P range, R range, N range, and D range, a 3 range which enables automatic shift change between the 1st speed and the 3rd speed, a 2 range which enables automatic shift change between the 1st speed and the 2nd speed, and an L range to fix to the 1st speed are set in the shift change lever.

Further, the manual valve 109 is connected with the reverse clutch 33 through a supply/discharge oil passage 116, and further with three electromagnetic change-over valves 112 to 114 for changing over supply and discharge of hydraulic oil to the clutches 20 and 34 and the 2·5 speed brake 31 through a first line pressure supply passage 117. Two electromagnetic valves 111 and 115 for change over supply and discharge of hydraulic oil to the brakes 36 and 59 and the 4-5 speed clutch 52 are connected with a second line pressure supply passage 118 which communicates halfway with the oil passage 110.

The five electromagnetic valves 111 to 115 are 3-way valves of a type which closes when unenergized operating according to an electrical signal from an electronic control unit 62 shown in FIG. 1, and communicate with each other through a discharge oil passage 119 communicating with the oil reservoir 101. Relation between the individual shift positions of the automatic transmission and ON/OFF operation of energizing to the five electromagnetic change-over valves 111 to 115 is as shown in FIG. 5.

The discharge oil passage 119 is also connected to the manual valve 109 through a discharge oil passage 120.

A back pressure oil passage 121 branched from the second line pressure supply passage 118 is connected to one end of a multifunction change-over control valve 122, and the change-over control valve 122 and the first electromagnetic valve 111 connect through a common supply/discharge passage 128. The change-over control valve 122 and the 1st speed-reverse brake 86 are connected through a supply/discharge oil passage 124 for supplying and discharging hydraulic oil to the 1st-reverse brake 36. Similarly, a supply/discharge oil passage 125 for supplying and discharging hydraulic oil to the 4-5 speed clutch 52 is connected to the change-over control valve 122 at the opposite side of a connection port of the supply/discharge oil passage 124 and is connected to the change-over control valve 122 across a connection port of the common supply/discharge passage 123.

A pair of discharge oil passages 126 and 127 connected to the change-over control valve 122 are individually connected to the discharge oil passage 119.

On the other hand, the second electromagnetic change-over valve 112 and the 2·5 speed brake 31 are connected through a supply/discharge oil passage 128 for supplying and discharging hydraulic oil to the 2·5 speed brake 31, and the third electromagnetic valve 113 and the 1-4 speed clutch 20 are connected through a supply/discharge oil passage 129 for supplying and discharging hydraulic oil to the 1-4 speed clutch 20. Further, the fourth electromagnetic valve 114 and the 3-5 speed clutch 34 are connected through a supply/discharge oil passage 130 for supplying and discharging hydraulic oil to the 3-5 speed clutch 34, and the fifth electromagnetic valve 115 and the 1-3 speed-reverse brake 53 are connected through a supply/discharge oil passage 131 for supplying and discharging hydraulic oil to the 1-3 speed-reverse brake 53.

A back pressure oil passage 132 branched from the supply/discharge oil passage 130 is connected with the end of the change-over control valve 122 opposite the end connected to bypass oil passage 121, and the regulator valve 104 and the multifunction change-over control valve 122 communicate with each other through a pilot pressure supply passage 193. Further, the change-over control valve 122 is incorporated with a compression coil spring 135 for urging a spool 134 of the change-over valve 122 to the right side in the Figure. That is, the spool 134 of the change-over control valve 122 is moved to right or left according to a difference between the pressure of hydraulic oil in the back pressure oil passage 132 and the spring force of the compression coil spring 135 and the line pressure in the back pressure oil passage 121.

The present embodiment has three change-over positions, the R position, the N position, and the D position, of a notch 137 formed in a spool of the manual valve 109. A connection relation of the shift change lever and the manual valve 109, is set so that: when the shift change lever is in the P range or N range, the notch 137 of the manual valve 109 is in the N position; when the shift change lever is in the R range, the notch 137 of the manual valve 109 is in the R position; and when the shift change lever is in the D range or 3 range or 2 range or L range, the notch 137 of the manual valve 109 is in the D position. With the shift change lever selected to the D range, when an auxiliary switch (not shown, hereinafter referred to as OD switch) is closed/engaged a forward five-stage automatic shift change capable of automatic transmission between the 1st speed and the 5th speed, or a forward four-stage automatic shift change capable of automatic transmission between the 1st speed and the 4th speed, can be selected.

That is, when the shift change lever is selected to one of the D range, 3 range, 2 range, and L range by the driver, the notch 137 formed in the spool 136 of the manual valve 109 is moved to the D position as shown to achieve a forward speed position corresponding to the operation condition of the vehicle by the ON/OFF combination of energizing to the five electromagnetic change-over valves 111 to 115 of which the energizing amount is duty controlled. When the shift change lever is selected to the P range or N range, the notch 137 of the spool 134 is moved to the N position as shown to achieve the neutral position. Further, when the shift change lever is selected to the R range, the notch 137 of the spool 134 is moved to the R position to achieve the reverse speed position in the automatic transmission.

In the present embodiment, to reduce shocks generated when the clutches 20, 34, and 52 and the brakes 31, 36, and 53 are engaged, accumulators 139 are connected through buffering oil passages 138 individually branched from the supply/discharge oil passages 124, 125, 128 to 131.

These accumulators 138 comprise pistons 140 facing the buffering oil passages and compression springs 141 for urging the pistons 140 to the buffering oil passage 138 side, whereby the pistons 140 slide up and down according to hydraulic oil in the buffering oil passages 138 and variation of the hydraulic pressure to suppress abrupt variation and pressure of hydraulic oil in the supply/discharge oil passages 124, 125, 128 to 131 communicating individually with the buffering oil passages 138.

Therefore, when the shift change lever (not shown) is set to the P range or N range, the notch 197 formed in the spool 196 of the manual valve 109 is also moved to the N position shown in FIGS. 3 and 4. Then, hydraulic oil discharged from the oil pump 103 according to operation of the engine is supplied from the oil passage 105 to the regulator valve 104 and the manual valve 109, also conducted from the regulator valve 104 to the torque converter control valve 107 through the oil passage 108, and hydraulic oil of a predetermined pressure is supplied to the torque converter 12 through an oil passage 142 connecting the torque converter control valve 107 and the torque converter 12. Further, hydraulic oil supplied to the manual valve 109 is supplied to the first electromagnetic change-over valve 111 and the fifth electromagnetic change-over valve 115 being energized (FIG. 5) through the second line pressure passage 118 branched from the oil passage 110 communicating with the manual valve 109. In this condition, the remaining three electromagnetic change-over valves 112 to 114 are maintained in an unenergized state (FIG. 5).

According to this, the discharge oil passage 119 connected to the oil reservoir 101 is connected to the supply/discharge oil passages 128 to 130 through the remaining three electromagnetic valves 112 to 114, and hydraulic oil is discharged from the clutches 20 and 34 and the 2-5 speed brake 31 to release the clutches 20 and 34 and the 2-5 speed brake 31. Further, in association with this, hydraulic pressure at the other end side of the change-over control valve 122 is reduced through the back pressure oil passage 132 connected to the supply/discharge oil passage 130, hydraulic oil at the line pressure is supplied from the second line pressure supply passage 118 to one end of the change-over control valve 122 through the back pressure oil passage 121, the spool 134 of the change-over control valve 122 is dislocated to the left end in the Figure corresponding to the first change-over position of the present invention against the spring force of the compression coil spring 135 to connect the common supply/discharge oil passage 123 and the supply/discharge oil passage 124, and connect the discharge oil passage 119 and the supply/discharge oil passage 125 through the discharge oil passage 127, thereby releasing the 4-5 speed clutch 52.

On the other hand, the line pressure from the oil pump 103 is regulated by the electromagnetic valve 111 through the oil passages 105 and 110 and the second line pressure supply passage, and supplied from the supply/discharge oil passage 124 to the 1st speed-reverse brake 36. Further, the line pressure from the oil pump 103 is regulated by the electromagnetic valve 115 through the oil passages 105 and 110 and the second line pressure supply passage 118, and supplied from the supply/discharge oil passage 131 to the 1-3 speed-reverse brake 53. Then, the brakes 36 and 53 are individually engaged to achieve the neutral position.

When the driver operates the shift change lever to select one of the D range, 3 range, 2 range, and L range, the notch 197 of the manual valve 109 is moved to the D position as shown, the line pressure from the oil passage 110 is supplied to the two electromagnetic change-over valves 111 and 115 through the second line pressure supply passage 118, and also from the first line pressure supply passage 117 to the three electromagnetic valves 112 to 114 through the manual valve 109.

In this case, when only the first, third, and fifth electromagnetic change-over valves 111, 115, and 115 are energized by the electronic control unit 62, the discharge oil passage 119 communicates with the supply/discharge oil passages 128 and 130 through the second and fourth electromagnetic change-over valves 112 and 114 and, similar to the above-described case of the N range, the supply/discharge oil passage 125 communicates with the discharge oil passage 119 by the discharge oil passage 127 through the change-over control valve 122. The hydraulic oil is discharged from the clutches 34 and 52 and the 2-5 speed brake 31 connected to the above passages to release the clutches 34 and 52 and the 2·5 speed brake 31.

On the other hand, the line pressure from the oil pump 103 is regulated by the energized first and fifth electromagnetic valves 111 and 115 and, similar to the above case of the N range, supplied individually to the 1st speed-reverse brake 36 and the 1-3 speed-reverse brake 53. Further, since the third electromagnetic change-over valve is also energized, the line pressure supplied from the oil passages 105 and 110 to the first line pressure supply passage 117 through the manual valve 109 is regulated by the third electromagnetic valve 119, and supplied to the 1-4 speed clutch 20. As a result, the brakes 36 and 53 and the 1-4 speed clutch 20 are individually engaged to achieve the 1st speed position.

Then, with the shift change lever set to one of the D range, 3 range, and 2 range, when only-the second, third, and fifth electromagnetic change-over valves 112, 113, and 115 are energized by the electronic control unit 62, the common supply/discharge passage 123 communicates with the discharge oil passage 119 through the unenergized first electromagnetic change-over valve 111, hydraulic oil supplied to the 1st speed-reverse brake 36 is discharged from the supply/discharge oil passage 124 to the discharge oil passage 119 side through the change-over control valve 112, the common supply/discharge oil passage 123, and the first electromagnetic change-over valve 111. Further, similar to the case of the N range, the supply/discharge oil passage 125 communicates with the discharge oil passage 119 through the change-over valve 122 by the discharge oil passage 127, and the discharge oil passage 119 communicates with the supply/discharge oil passage 190 through the fourth electromagnetic valve 114. As a result, hydraulic oil is discharged from the clutches 33, 34, and 52, and the 1st speed-reverse brake 36 to release the clutches 33, 34, and 52 and the 1st speed--reverse brake 36.

On the other hand, the line pressure supplied from the oil pump 103 to the first line pressure supply passage 117 through the oil passages 105 and 110 and the manual valve 109 is regulated by the energized second and third electromagnetic valves 112 and 113, and supplied from the supply/discharge oil passages 128 and 129 to the 2.5 speed brake 31 and the 1-4 speed clutch 20. Further, since the fifth electromagnetic valve 115 is also being energized, the line pressure supplied from the oil pump 103 through the oil passages 105 and 110 and the second line pressure supply passage 118 is regulated by the fifth electromagnetic change-over valve 115, and supplied from the supply/discharge oil passage 131 to the 1-3 speed-reverse brake 53. As a result, the brakes 31 and 53 and the 1-4 clutch 20 are individually engaged to achieve the 2nd speed position.

Further, with the shift change lever set to one of the D range and 3 range, when only the third to fifth electromagnetic change-over valves 113 to 115 are energized by the electronic control unit 62, similar to the case of the 2nd speed, the line pressure from the oil pump 103 is regulated by the third to fifth electromagnetic change-over valves 113 to 115 and supplied to the 1-4 speed clutch 20 and the 1-3 speed-reverse brake 53, and the first line pressure supply passage 117 and the supply/discharge oil passage 130 enter communication with each other through the fourth electromagnetic change-over valve 114. As a result, the line pressure from the oil pump 10 is regulated by the fourth electromagnetic change-over valve 114 and supplied also to the 2-5 speed clutch 24 to engage the clutches 20 and 34 and the 1-3 speed-reverse brake 53.

In association with this, since hydraulic oil from the supply/discharge oil passage 190 regulated by the electromagnetic change-over valve 114 is supplied also to the back pressure oil passage 132, the spool 134 of the change-over control valve 112 is dislocated to the right end in the Figure corresponding to the second change-over position of the present invention, the common supply/discharge oil passage 123 and the supply/discharge oil passage 125 connect, and the discharge oil passage 126 communicating with the discharge oil passage 119 connects to the supply/discharge oil passage 124. This causes the 4-speed clutch 52 to communicate with the discharge oil passage 119 through the supply/discharge oil passage 125, the common supply/discharge oil passage 129, and the first electromagnetic change-over valve 111. Further, hydraulic oil being supplied to the 1st speed-reverse brake 36 is discharged from the discharge oil passages 126 and 119 through the supply/discharge oil passage 124, and the supply/discharge oil passage 126 communicates with the discharge oil passage 119 through the second electromagnetic change-over valve 112. As a result, the brakes 31 and 36 and the clutches 33 and 52 are released to achieve the 3rd speed position.

When the spool 134 of the change-over control valve 122 is dislocated to the right end in the Figure, the back pressure oil passage 132 and the pilot pressure supply passage 133 communicate with each other, hydraulic oil from the back pressure oil passage 132 as a pilot pressure acts on a pair of lands 144 and 145 formed in a spool 143 of the regulator valve 104. Then, the spool 143 is dislocated to the left side in the Figure by a difference in pressure receiving area to increase the amount of hydraulic oil flowing from the oil passage 105 to the return oil passage 106. As a result, the line pressure supplied from the oil passage 110 to the line pressure supply passages 117 and 118 is decreased to reduce the supply pressure to the frictional engaging element of the engagement side in the 3rd speed position. This condition is continued in the case of the 4th and 5th speed positions which will be described later. In short, the line pressure in a high-speed position of the 3rd speed or higher is set lower than the line pressure in a low-speed position of the 2nd speed or lower where the driving torque is high.

Further, with the shift change lever set to the D range, when only the first, third, and fourth electromagnetic change-over valves are energized by the electronic control unit 62, the brakes 31 and 53 communicating with the unenergized second and fifth electromagnetic change-over valves 112 and 115 communicate with the discharge oil passage 119 to be released, and further the change-over control valve 112 is maintained in the above-described 3rd speed condition, and the 1st speed-reverse brake 36 is also maintained in a released condition.

On the other hand, the line pressure from the oil pump 103 is regulated by the energized third and fourth electromagnetic change-over valves 113 and 114 and supplied individually to the clutches 20 and 34. Further, since the first electromagnetic change-over valve is being energized, the line pressure supplied from the oil passages 105 and 110 through the second line pressure supply passage 118 is regulated by the first electromagnetic change-over valve 111 and supplied from the common supply/discharge oil passage 123 and the supply/discharge oil passage 125 to the 4-speed clutch 52. As a result, the clutches 20 and 34 are individually engaged to achieve the 4th speed position.

Then, with the shift change lever set to the D range and the OD switch on, when only the first, second, and fourth electromagnetic change-over valves 111, 112, and 114 are energized by the electronic control unit 62, the 1–4 speed clutch 20 and the 1–3 speed-reverse brake 53 communicating with the unenergized third and fifth electromagnetic change-over valves 113 and 115 communicate with the discharge oil passage 119 and, similar to the case of the 4th speed, and the supply/discharge oil passage 124 connected to the 1st speed-reverse brake 36 communicates with the discharge oil passages 126 and 119 through the change-over control valve 122 to release the 1–4 speed clutch 20 and the brakes 36 and 53.

On the other hand, the line pressure from the oil pump 103, similar to the case of the 4th speed, is regulated by the energized first and fourth electromagnetic change-over valves 111 and 114 and supplied individually to the clutches 34 and 52. Further, since the second electromagnetic valve 112 is being energized, the line pressure from the oil pump 103 is regulated be the second electromagnetic change-over valve 112 and supplied also to the 2-5 speed brake 31. As a result, the clutches 34 and 52 and the 2-5 speed brake 31 are individually engaged to achieve the 5th speed position.

Figure 6:
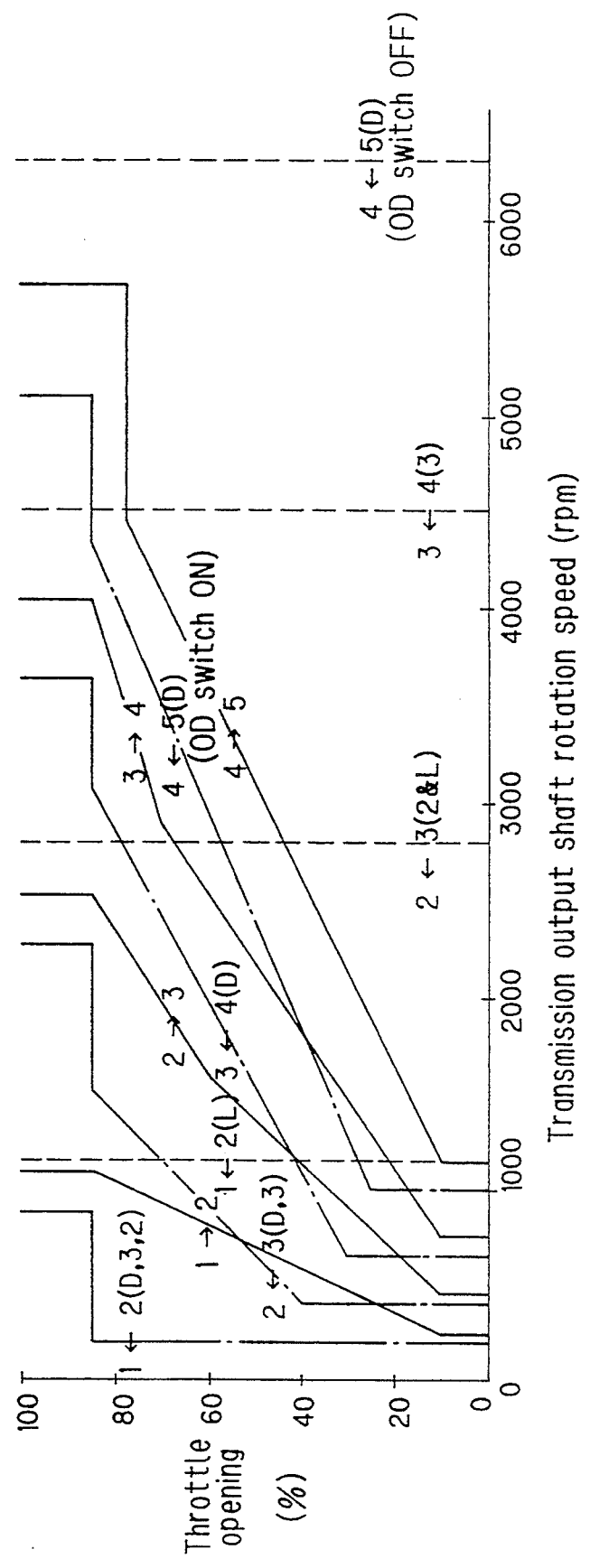
FIG. 6 is a speed shift map showing setting areas of individual speed positions set according to the transmission output shaft rotation speed and throttle opening.

These 1st to 5th speed positions are selected from a shift change map as shown in FIG. 6 previously stored in the electronic control unit 62 in response to the position of the shift change lever and ON/OFF condition of the OD switch according to the rotation speed of the transmission output shaft 40 and a throttle opening corresponding to the traveling speed of the vehicle.

On the other hand, when the driver operates the shift change lever to select the R range, the notch 137 of the manual valve 109 is moved to the R position as shown, hydraulic oil from the oil passage 110 is supplied from the supply/discharge oil passage 116 to the reverse clutch 33 through the manual valve 109, and the oil passage 118 communicating with the electromagnetic valves 112 to 114 is connected to the discharge oil passage 120.

Here, since only the first and fifth electromagnetic change-over valves ill and 115 are energized by the electronic control unit 62, hydraulic oil is discharged from the clutches 20 and 33 and the 2-5 speed brake 31 communicating with the unenergized second to fourth electromagnetic change-over valves 112 to 114 and, similar to the case of the above-described N range, the spool 134 of the change-over control valve 122 is dislocated to the left end in the Figure, and the supply/discharge oil passage 125 and the discharge oil passage 127 communicate with each other to release the clutches 20, 34, and 52 and the 2-5 speed brake 31.

On the other hand, the line pressure from the oil pump 103 is regulated by the energized first and fifth electromagnetic change-over valves 111 and 115 and supplied to the brakes 36 and 53. As a result, these brakes 36 and 53 and the reverse clutch 33 are individually engaged to achieve the reverse position.

As described above, in the present embodiment, since hydraulic oil from the first electromagnetic change-over valve 111 is supplied to one of the 1st speed-reverse brake 36 and 4-5 speed clutch 52 by the change-over control valve 122, electromagnetic change-over valves are not required for the individual frictional engaging elements as used in the prior art and, since the change-over control valve 122 functions also as a pilot pressure supply source for changing over the line pressure to the regulator valve 104, further simplification of the hydraulic circuit can be achieved. By applying such a structure to the 1–4 speed clutch 20, the 2-5 speed brake 31, the 3–5 speed clutch, and 1–3 speed-reverse brake 53 as other frictional engaging elements, the number of the electromagnetic change-over valves 112 to 115 can be further reduced, thereby achieving even further cost reduction.

Furthermore, in the above-described embodiment, in an automatic-transmission of five forward speeds and a reverse speed, the 1st speed-reverse brake is adopted as the first frictional engaging element, the electromagnetic valve 111 as the first control valve, the 3–5 speed clutch 34 as the second frictional engaging element, the electromagnetic change-over valve 114 as the second control valve, and the 4-5 speed clutch 52 as the third frictional engaging element, however, it is also possible to set other combinations, and it can also be applied to other types of automatic transmissions of four forward speeds or three forward speeds.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic control apparatus for an automatic transmission comprising:
   a plurality of frictional engaging elements including a first frictional engaging element for achieving a low-speed side position, a second frictional engaging element for achieving a position higher in speed than the low-speed side position, a third frictional engaging element for achieving a position even higher in speed than the high-speed side position;
   a regulator valve for regulating hydraulic pressure of hydraulic pressure of hydraulic oil discharged from an oil pump to a predetermined pressure and reducing the predetermined hydraulic pressure in response to supply of a pilot pressure;
   a control valve for controlling the hydraulic pressure from said regulator valve to a desired hydraulic pressure, for controlling hydraulic pressures to said plurality of frictional engaging elements; and
   a multifunction change-over valve for making said control valve in communication with one of said first frictional engaging element and said third frictional engaging element and supplying and discharging the pilot pressure to said regulator valve,
      wherein said change-over valve is operated by hydraulic pressure supplied to said second frictional engaging element and takes a first position where said control valve communicates with said first frictional engaging element and blocks supply of the pilot pressure to said regulator valve when the hydraulic pressure supplied to said second frictional engaging element is lower than a predetermined value, and takes a second position where said control valve communicates with said third frictional engaging element and supplies the pilot pressure to said regulator valve when the hydraulic pressure supplied to said second frictional engaging element is higher than a predetermined value.

2. The apparatus of claim 1 wherein:
the pilot pressure is a hydraulic pressure supplied to said second frictional engaging element.

3. The apparatus of claim 2 further comprising:
a second hydraulic pressure control valve disposed in an oil passage for making communication between said regulator valve and said second frictional engaging element for controlling hydraulic pressure supplied to said second frictional engaging element.

* * * * *

UNITED STATES PATENT AND TRADEMARK OFFICE
CERTIFICATE OF CORRECTION

PATENT NO. : 5,441,459
DATED : August 15, 1995
INVENTOR(S) : S. INUKAI et al.

It is certified that error appears in the above-indentified patent and that said Letters Patent is hereby corrected as shown below:

On the title page, item "[73] Assignee:" change "Mitsubishi Jidosha Kogyo Kaubshiki Kaisha, Tokyo, Japan" to --Mitsubishi Jidosha Kogyo Kabushiki Kaisha, Tokyo, Japan--

Signed and Sealed this

Ninth Day of January, 1996

Attest:

BRUCE LEHMAN

*Attesting Officer*     *Commissioner of Patents and Trademarks*